(12) United States Patent
Aran et al.

(10) Patent No.: US 9,908,134 B2
(45) Date of Patent: Mar. 6, 2018

(54) COATING OF A GLASS SLEEVE

(71) Applicant: SIEMENS CONCENTRATED SOLAR POWER LTD., Beit Shemesh (IL)

(72) Inventors: Hagai Aran, Tarum (IL); Victor Levin, Jerusalem (IL); Elad Mor, Mazkeret Batya (IL)

(73) Assignee: Siemens Concentrated Solar Power Ltd. (IL)

( * ) Notice: Subject to any disclaimer, the term of this patent is extended or adjusted under 35 U.S.C. 154(b) by 316 days.

(21) Appl. No.: 14/406,549

(22) PCT Filed: Jun. 3, 2013

(86) PCT No.: PCT/EP2013/061385
§ 371 (c)(1),
(2) Date: Dec. 9, 2014

(87) PCT Pub. No.: WO2013/189727
PCT Pub. Date: Dec. 27, 2013

(65) Prior Publication Data
US 2015/0136118 A1    May 21, 2015

(30) Foreign Application Priority Data
Jun. 22, 2012  (EP) .................................... 12173203

(51) Int. Cl.
*C03C 17/00*    (2006.01)
*F24J 2/05*    (2006.01)
(Continued)

(52) U.S. Cl.
CPC ................ *B05B 13/06* (2013.01); *B05C 3/02* (2013.01); *B05C 3/109* (2013.01); *B05C 3/20* (2013.01);
(Continued)

(58) Field of Classification Search
CPC ........... B05B 13/06; B05C 3/02; B05C 3/109; B05C 3/20; B05C 5/0241; B05C 7/00;
(Continued)

(56) References Cited

U.S. PATENT DOCUMENTS

| 2003/0113448 A1* | 6/2003 | Tratzky ................. C03C 17/004 427/230 |
| 2004/0163640 A1* | 8/2004 | Kuckelkorn ............. F24J 2/062 126/694 |

(Continued)

FOREIGN PATENT DOCUMENTS

| CN | 201203292 Y | 3/2009 |
| CN | 101423934 A | 5/2009 |

(Continued)

OTHER PUBLICATIONS

International Preliminary Report on Patentability for PCT/EP2013/061385, dated Dec. 23, 2014, 11 pages.*

(Continued)

*Primary Examiner* — William P Fletcher, III
(74) *Attorney, Agent, or Firm* — Schmeiser Olsen & Watts LLP

(57) ABSTRACT

Disclosed is a method of applying a coating to a glass sleeve with an inner surface and an outer surface, the glass sleeve configured as a part of a solar-receiver tube. Thereby, the coating is solely applied to one of the surfaces of the glass sleeve. Also disclosed is a method of fixing such glass sleeve in an interior of a coating tank, such coating tank and a fixing arrangement for fixing such glass sleeve in an interior of a coating tank.

10 Claims, 10 Drawing Sheets

(51) Int. Cl.

| | | |
|---|---|---|
| *F24J 2/50* | (2006.01) | |
| *B05D 7/22* | (2006.01) | |
| *B05B 13/06* | (2006.01) | |
| *B05C 3/20* | (2006.01) | |
| *B05C 3/109* | (2006.01) | |
| *B05C 3/02* | (2006.01) | |
| *B05C 13/00* | (2006.01) | |
| *B05C 7/00* | (2006.01) | |
| *B05C 13/02* | (2006.01) | |
| *B05C 7/04* | (2006.01) | |
| *B05C 5/02* | (2006.01) | |
| *B05D 1/36* | (2006.01) | |
| *B05D 5/06* | (2006.01) | |
| *B05D 1/38* | (2006.01) | |
| *B05D 1/18* | (2006.01) | |

(52) U.S. Cl.
CPC .............. *B05C 5/0241* (2013.01); *B05C 7/00* (2013.01); *B05C 7/04* (2013.01); *B05C 13/00* (2013.01); *B05C 13/02* (2013.01); *B05C 13/025* (2013.01); *B05D 1/18* (2013.01); *B05D 1/36* (2013.01); *B05D 1/38* (2013.01); *B05D 5/06* (2013.01); *B05D 5/061* (2013.01); *B05D 5/063* (2013.01); *B05D 5/067* (2013.01); *B05D 7/22* (2013.01); *B05D 7/222* (2013.01); *C03C 17/004* (2013.01); *C03C 17/005* (2013.01); *F24J 2/055* (2013.01); *B05D 2203/35* (2013.01); *B05D 2254/02* (2013.01); *B05D 2254/04* (2013.01); *C03C 2217/78* (2013.01); *C03C 2218/111* (2013.01); *F24J 2/505* (2013.01); *F24J 2/507* (2013.01); *Y02E 10/44* (2013.01)

(58) Field of Classification Search
CPC B05C 7/04; B05C 13/00; B05C 13/02; B05C 13/025; B05D 1/18; B05D 1/36; B05D 1/38; B05D 5/06; B05D 5/061; B05D 5/063; B05D 5/067; B05D 7/22; B05D 7/222; B05D 2203/35; B05D 2254/02; B05D 2254/04; F24J 2/055; C03C 17/004; C03C 17/005; Y02E 10/40

USPC .......... 118/408, 423, 428, 429, DIG. 10–13; 126/569–713; 427/230–239, 407.2, 430.1
See application file for complete search history.

(56) References Cited

U.S. PATENT DOCUMENTS

2007/0221313 A1* 9/2007 Franck .................. F24J 2/1057
156/91
2010/0330276 A1* 12/2010 Wang .................. C23C 18/1616
427/236

FOREIGN PATENT DOCUMENTS

| DE | 218160 A1 | 1/1985 |
|---|---|---|
| DE | 20 2005 014831 U1 * | 11/2005 |
| DE | 202005014831 U1 | 11/2005 |
| EP | 1302451 A1 | 4/2003 |
| EP | 1302451 B1 | 12/2004 |
| JP | S5774547 A | 5/1982 |
| JP | S59229133 A | 12/1984 |
| JP | S6375780 A | 4/1988 |
| JP | 2004307742 A | 11/2004 |
| JP | 2012093005 A | 5/2012 |
| WO | WO 2009140051 A2 | 11/2009 |
| WO | WO 2011029857 A2 | 3/2011 |

OTHER PUBLICATIONS

Sun Yunlian, "New energy and distributed generation technology", Nov. 30, 2009; p. 9, Putong Gaodeng Jiaoyu Shiyiwu Guihua Jiaocai; Xinnengyuan Ji Fenbushi Fadian Jishu, China Electric Power Press, ISBN 978-7-5083-9659-0; 2009.
Chinese Office Action and its English translation for Chinese application No. 201380032875.3, dated Dec. 21, 2016.
Partial European Search Report for EP Application No. 12173203.6, dated Nov. 27, 2012.
Extended European Search Report for EP Application No. 12173203.6, dated Mar. 21, 2013.
International Search Report and Written Opinion for PCT application No. PCT/EP2013/061385, dated Nov. 14, 2013.
Japanese Office Action dated Mar. 22, 2016; JP Pat. Appl. No. 2015-517659; 6 pgs.
Australian Office Action dated May 16, 2016; Australian Pat. Appl. No. 2013279643; 3 pgs.

* cited by examiner

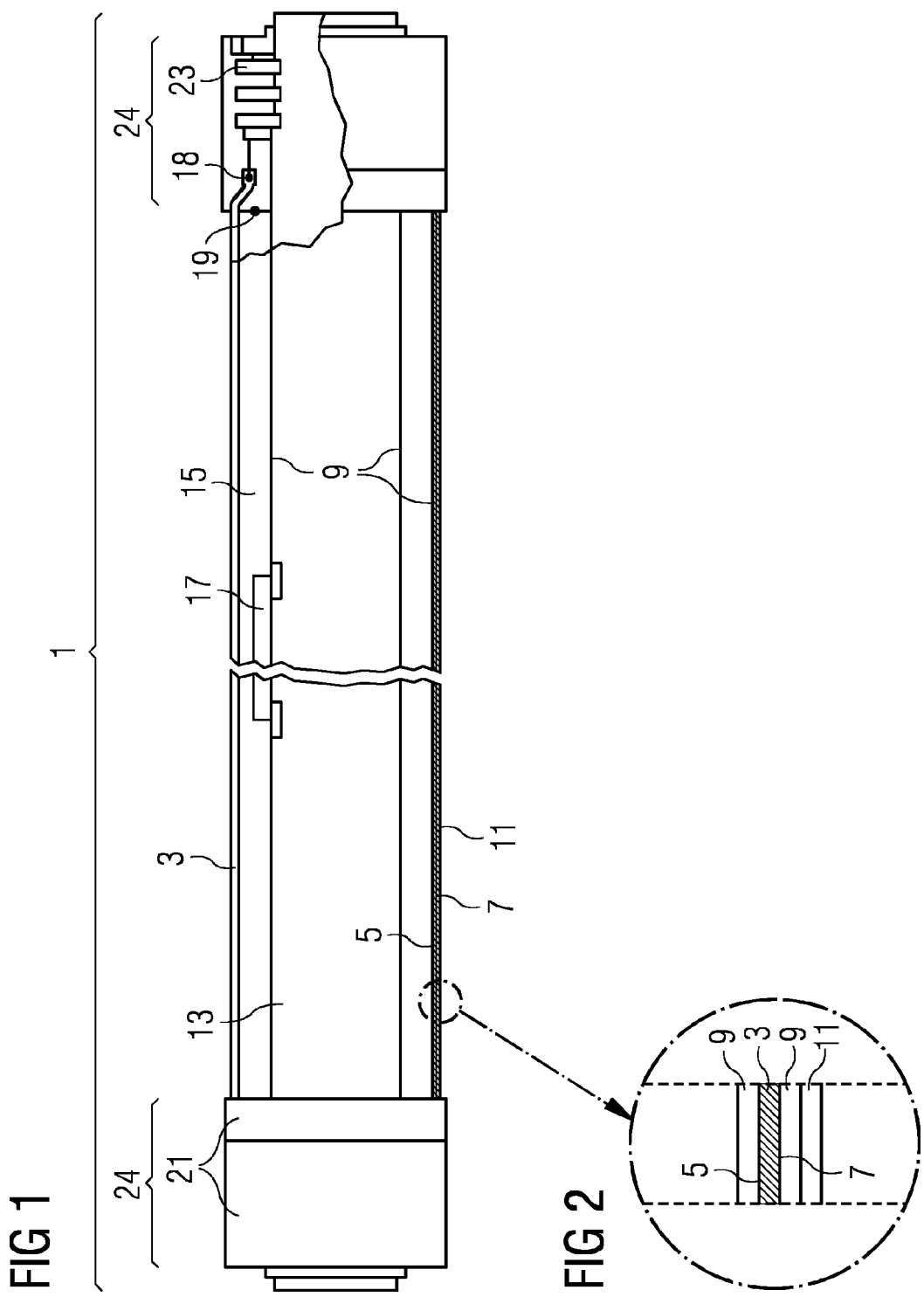

COATING OF A GLASS SLEEVE

CROSS-REFERENCE TO RELATED APPLICATIONS

This application claims priority to PCT Application No. PCT/EP2013/061385 having a filing date of Jun. 3, 2013, based off of EP12173203.6 having a filing date of Jun. 22, 2012, the entire contents of which are hereby incorporated by reference.

FIELD OF TECHNOLOGY

The following relates to a method of and a coating tank for applying a coating of a specific, selected kind to a glass sleeve with an inner surface and an outer surface, the glass sleeve is configured as a part of a solar-receiver tube. Embodiments of the invention also relates to a method of and a fixing arrangement for fixing a glass sleeve configured as a part of a solar-receiver tube in an interior of a coating tank. Further, it concerns a glass sleeve with an inner surface and an outer surface, which glass sleeve is configured as a part of a solar-receiver tube.

BACKGROUND

Solar-receiver tubes are used in solar power plants, for example, parabolic-trough power plants, which convert solar energy into electric energy. In this type of a solar power plant, a parabolically curved reflector reflects the sunlight onto a solar-receiver tube positioned at its focal point. The main operational parts of a solar-receiver tube comprise a glass sleeve surrounding a metal absorber tube, by means of which solar energy is converted to thermal energy. The thermal energy is absorbed and stored by a fluid used as a heat transfer medium, which circulates in a closed pipeline system. By a heat exchanger the thermal energy is transferred from the fluid to water, which is then used to run a steam turbine producing electric energy.

The conversion process of solar energy to thermal energy by means of a solar-receiver tube is accompanied by a transmission loss concerning several elements of a glass sleeve which is a part of the solar-receiver tube.

Firstly, a part of the immitted light is reflected and absorbed by the wall of the glass sleeve. Therefore, at both surfaces of the glass sleeve, and anti-reflective coating is applied.

Secondly, a transmission loss is caused by a scratch-resistant coating, which is applied to protect the anti-reflective coatings at both surfaces. The increased durability of the anti-reflective coating is therefore accompanied by a decreased efficiency of the solar-receiver tube.

During the process of applying a coating to a glass sleeve in a coating tank forces take effect on the fragile glass sleeve, which can lead to its damage and breakage. Especially in areas, where interfaces designed to hold the glass sleeve in a predefined position are in close contact to the wall of the glass sleeve there is a risk of damage. In particular, this is the case during coating processes using dipping techniques when buoyancy forces the glass sleeve upwards and presses it against the contact interface.

SUMMARY

An aspect relates to improving the efficiency of a solar-receiver tube. In particular, this improvement preferably relates to a reduction of the transmission loss of solar energy of a glass sleeve without diminishing its durability.

A further aspect relates to providing a better protection of glass sleeves against damage during the coating process and thus to reduce waste in the production process.

Accordingly, the above-mentioned method of applying a coating is characterized by the fact that the coating is solely applied to one of the inner and outer surfaces of the glass sleeve.

Each type of coating displays specific qualities. In order to acquire positive effects, the selection of a coating of one specific kind is made in accordance with its specific functions with respect to the component to be coated. With reference to glass sleeves surrounding absorber tubes, the method of applying a coating solely to one of the inner and outer surfaces of a glass sleeve provides for savings of material and for a more precise application of the coating. As the application of coatings to surfaces can have both advantageous and disadvantageous effects, the method just described results in a reduction of such disadvantageous effects. These are caused when one of the two surfaces is coated which does not profit (to a desired extent) from the possibly advantageous effects of a coating of a specific kind because the two surfaces fulfill different functions. Then consequently the whole device suffers from the disadvantageous effects of the coating applied to that side.

Throughout the description, the term "coating" therefore refers to one particular coating of a selected, i.e. designated, i.e. specific kind with a particular formulation and/or with one particular purpose or function with respect to the glass sleeve. That means that a glass sleeve can be coated with more than just one coating each of such selected kind, some coating of which can be applied to both surfaces of the glass sleeve. The coating in question will then be that coating that is solely applied to one surface.

In order to relate these general observations to the embodiments of the invention, the specific functions of the surfaces of a glass sleeve as part of a solar-receiver tube shall now be described.

The outer surface of the glass sleeve serves as protection and shield of the absorber tube against mechanical stress, whereas the inner surface provides for maintaining a vacuum in the space between the absorber tube and the glass sleeve and thus reduces the absorption of heat. The wall of the glass sleeve fulfills the functions of a transmission medium for electromagnetic radiation and of a thermal insulator and moreover represents a carrier for applying coatings in order to improve the qualities of its two surfaces.

The expression "solar-receiver tube" is used for a completely assembled solar-receiver tube, but also for a solar-receiver tube which is not yet completely assembled. Such is the case during the construction of solar-receiver tubes, whereby a solar-receiver tube comprises at least a glass sleeve and an absorber tube and parts or components of an interface between an absorber tube and a glass sleeve.

Generally, the method according to embodiments of the invention can be carried out manually, for instance by hermetically sealing an end section of the glass sleeve my means of a seal, possibly supported by a holding structure which holds the bellow. However, it is preferred to carry out the method automatically. Thus, embodiments of the invention also concern a coating tank of the above-mentioned kind, in particular for implementing the method, whereby the coating tank is configured to apply the coating solely to one of the inner and outer surfaces of the glass sleeve.

Thus, embodiments of the invention also concern the product of the coating tank put into operation, a glass sleeve of the above-mentioned kind, whereby the coating is solely applied to one of the inner and outer surfaces of the glass sleeve.

Further, embodiments of the invention relates to a method of fixing a glass sleeve configured as a part of a solar-receiver tube in an interior of a coating tank by means of a fixing arrangement, which fixing arrangement comprises an interface configured to connect to at least one contact interface of the glass sleeve when the glass sleeve is positioned in a designated operating position within the coating tank, whereby the interface comprises an elastic element in a bottom region of the coating tank, which in operation holds the glass sleeve elastically in its operating position.

The glass sleeve displays an increased fragility because of its thin walls. During the processes of introducing the glass sleeve into the coating tank and of applying a coating to the glass sleeve forces affect its surfaces, which can lead to its damage and even breakage. Firstly, placing the end section of the glass sleeve on the bottom of the tank creates a certain shock to its entire structure. Secondly, when using a dipping method for applying a coating, due to the differences in density of a liquid coating and a glass sleeve, a buoyancy is generated which mainly affects end section, in particular the bellows, of the glass sleeve and lifts it upwards.

In order to avoid tension and thus possible damages to the glass sleeve during the coating process, for instance an inflatable seal can serve as an elastic element and thus an elastic interface in the bottom region of the coating tank. Such inflatable seal shaped as an annular tube, for instance displays a diameter similar to the diameter of the annular end section of the glass sleeve. It rests in a bottom region of the coating tank while the end section of the glass sleeve rests on the inflatable seal. Such inflatable seal displays its quality of pretension even before being inflated. According to a particularly advantageous embodiment of the invention related to the described fixing arrangement, the buoyancy affecting the glass sleeve during the coating process in a coating tank is reduced to zero. This effect is reached by both the design of the end section, in particular a bellow, located at the bottom of the coating tank and the position of the elastic element at the end section of the glass sleeve.

Due to the fact, that the pressure of the coating liquid is affecting the whole surface of the glass sleeve to an equal degree in an equal depth, the special design of the end section, in particular a bellow, implies that the surface of the end section affected by buoyancy is equal to the surface of the end section affected by downforce pressure. The addition of both forces results in their neutralization. This method provides for a lower risk of damage or breakage of the glass sleeve and for a higher efficiency of the coating process as a whole.

Embodiments of the invention also concerns a fixing arrangement for implementing such method. Such fixing arrangement for fixing a glass sleeve as part of a solar-receiver tube in an interior of a coating tank, in particular a coating tank, comprises an interface configured to connect to at least one contact interface of the glass sleeve when the glass sleeve is positioned in a designated operating position within the coating tank, whereby the interface comprises an elastic element which holds the glass sleeve elastically in its operating position. Preferably such fixing arrangement is comprised by a coating tank.

The method of applying a coating to a glass sleeve realized as a solar-receiver tube advantageously comprises the steps of introducing the glass sleeve into a coating tank which rests in an essentially horizontal loading position, tilting the loaded coating tank to an essentially vertical operating position applying a coating to the glass sleeve while the coating tank is resting in an essentially vertical operating position, tilting the coating tank back to an essentially horizontal unloading position, unloading the coated glass sleeve from the coating tank.

This method proves advantageous because it demands few structural requirements compared to a solution which relies on dipping the glass sleeves into the coating tanks from above. Thus, the tilt mechanism of the coating device requires less interior height of production halls. Further, it makes cranes unnecessary, which introduce the glass sleeves into the coating tanks from a position above the tanks.

Particularly advantageous embodiments and features of the invention are given by the dependent claims, as revealed in the following description. Thereby, features revealed in the context of one of the methods may also be realized in the context of the respective other method and/or in the context of any one of the embodiments of the glass sleeve and/or coating tank and/or coating device and/or fixing arrangement unless the contrary is explicitly stated.

It is principally possible to apply the coating in form of a powder coating. It is however preferred to use a fluid coating because this can be considered an easy and well-proven application method.

Accordingly, instead of applying a coating by using a dipping process, one could rely on the alternative application method of spraying, for example by sputtering. The dipping method is however preferred as it is easy to handle and requires a comparatively low constructive effort. Thereby "dipping" also refers to a process in which the glass sleeve is not introduced into a dipping liquid but rather in which the dipping liquid is introduced into a coating tank in which the glass sleeve is already present.

Accordingly, in a preferred embodiment of the invention, the coating tank is flooded with a liquid coating after fastening the glass sleeve in a predefined operating position within the coating tank. This method is particularly advantageous because flow forces and buoyancy occur when introducing the coating, which could make the glass sleeve move uncontrolledly within the coating tank. In order to prevent possible damages due to contacts with the glass sleeve and the wall of the coating tank, the risk of movements can be diminished by fastening the sleeve before introducing the liquid coating.

Furthermore, it is preferred to permanently connect the coating to an anti-reflective layer applied on a surface of the glass sleeve. Such anti-reflective layer can also be realized as a functional coating. Depending on the specific qualities of the selected kind of coating, this method can provide for a protection of the anti-reflective coating and thus for an increased durability of the coated glass sleeve and less maintenance effort.

In particular, reference is made to a scratch-resistant coating: scratch-resistant coatings protect surfaces against mechanical stress and thus enhance their long-term durability and reduce the effort of maintenance. Glass sleeves as used in solar-receiver tubes are designed for a transmission of light, i.e. solar energy, through their translucent walls to the highest possible degree. As the outer surfaces of glass sleeves largely embody the outer surfaces of solar-receiver tubes, they are exposed to mechanical stress. As solar power plants are often located in desert areas, the anti-reflective coating applied to glass sleeves is damaged by friction caused by the grain of sand. However, the application of a scratch-resistant coating to a glass sleeve also causes an energy loss when electromagnetic radiation permeates through the wall of the glass sleeve because a scratch-resistant coating is not entirely transparent and thus a part of electromagnetic radiation is absorbed or reflected. This is contrary to the objective of the use of glass sleeves. Thus, applying a scratch-resistant coating solely to the outer surfaces of the glass sleeve leads to a substantial reduction of the transmission loss of solar energy, namely by half compared to the application of a scratch-resistant coating to both the inner and the outer surfaces of the glass sleeve. This leads to an increase of transmission through the glass sleeve of about 0.27%, which is a value well above the tolerance level.

The glass sleeve as part of a solar-receiver tube becomes more durable against mechanical stress through a scratch-resistant coating applied to the outer surface of the glass sleeve. On the other hand, the inner surface of the glass sleeve is not exposed to mechanical stress as an air-tight and water-tight sealing keeps a vacuum in the space between the wall of the absorber tube and the wall of the glass sleeve and prevents particles from entering into this space. Thus, a scratch-resistant coating on the inner surface is not necessary. As a consequence, the glass sleeve coated only on the outer surface by a scratch-resistant coating shows the same degree of resistance as one according to the state-of-the-art and at the same time an increased energy efficiency. An alternative solution, which could comprise the application of a scratch-resistant coating solely to the inner surface of the glass sleeve, would neither increase the durability of the anti-reflective coating applied to the glass sleeve nor increase efficiency.

The coating tank preferably comprises at least one seal realized and positioned to interface with an opening of the glass sleeve when the latter is positioned in a designated operating position within the coating tank. By such sealing mechanism the coating can be prevented from entering the interior (or in other cases: the exterior) of the glass sleeve. Thus, an application of a scratch-resistant coating solely to the outer surface of the sleeve can be realized.

As mentioned above, the at least one seal preferably comprises an inflatable seal. When inflated, the diameter of the seal extends and exerts a pressure on elements of the interface designed to hold the glass sleeve in its designated operating position. If this pressure and the corresponding counterpressure exerted by the said interface is higher than the pressure exerted by the surrounding liquid coating on the area covered by the inflated seal, a sealing mechanism is provided that prevents the liquid coating from entering the interior of the glass sleeve. A sealing through an inflatable seal requires a comparatively low constructive effort and provides for an easy handling.

Furthermore, the coating tank can comprise a shear pin which fixes an end section of the glass sleeve in a predefined position. Part of the fixing arrangement, the shear pin can be assembled in a position essentially rectangular to the wall of the glass sleeve when the sleeve is in an operating position. When buoyancy exerts a longitudinal loading on the glass sleeve this pressure is transferred to the shear pin by the end section of the sleeve from an essentially rectangular direction. The shear pin is preferably designed to break through already at a load which does not lead to a breakage of the glass sleeve. By protecting the sleeve, the shear pin shows a clear advantage over a fixed pin, which could alternatively be used as a fixing device.

In addition to the mentioned shear pin, which fixes the bottom end section of the glass sleeve in a predefined position within the coating tank, the above-mentioned inflatable seal can act as a further part of the fixing arrangement. When inflated, the inflatable seal exerts pressure both on the bottom cover of the coating tank and on an end section of the glass sleeve lying on it. As the bottom cover of the coating tank is rigid, the pressure exerted by the inflated seal lifts the glass sleeve if the latter is lighter than the pressure generated by inflating the seal. If this is the case, the bottom end section of the glass sleeve transfers the pressure to the shear pin, which exerts a counterpressure until it shears. This construction both acts as an arrangement for fixing the glass sleeve within the tank and provides a sealing mechanism by preventing the entering of the liquid coating into the interior of the glass sleeve. The shear pin prevents the glass sleeve from being damaged by shearing in the case of mechanical overload.

Further, the above-mentioned coating tank comprises at least the following elements:
- an inlet for introducing a coating into the tank,
- a drain for collecting a surplus amount of the coating at a bottom region of the coating tank,
- and an adaptive fixing arrangement for holding differently sized glass sleeves in different designated operating positions within the tank.

Such adaptive fixing arrangement may comprise a movable interface which can be adjusted to different lengths of glass sleeves. In combination with these devices, the coating tank enables an easy and secure procedure of applying the coating to glass sleeves of different sizes and/or shapes while demanding a comparatively low constructive effort.

BRIEF DESCRIPTION

Some of the embodiments will be described in detail, with reference to the following figures, wherein like designations denote like members, wherein:

FIG. 1 shows a cross-sectional view of a solar-receiver tube according to an embodiment of the invention;

FIG. 2 shows a detail of FIG. 1;

DETAILED DESCRIPTION

Figure 3:
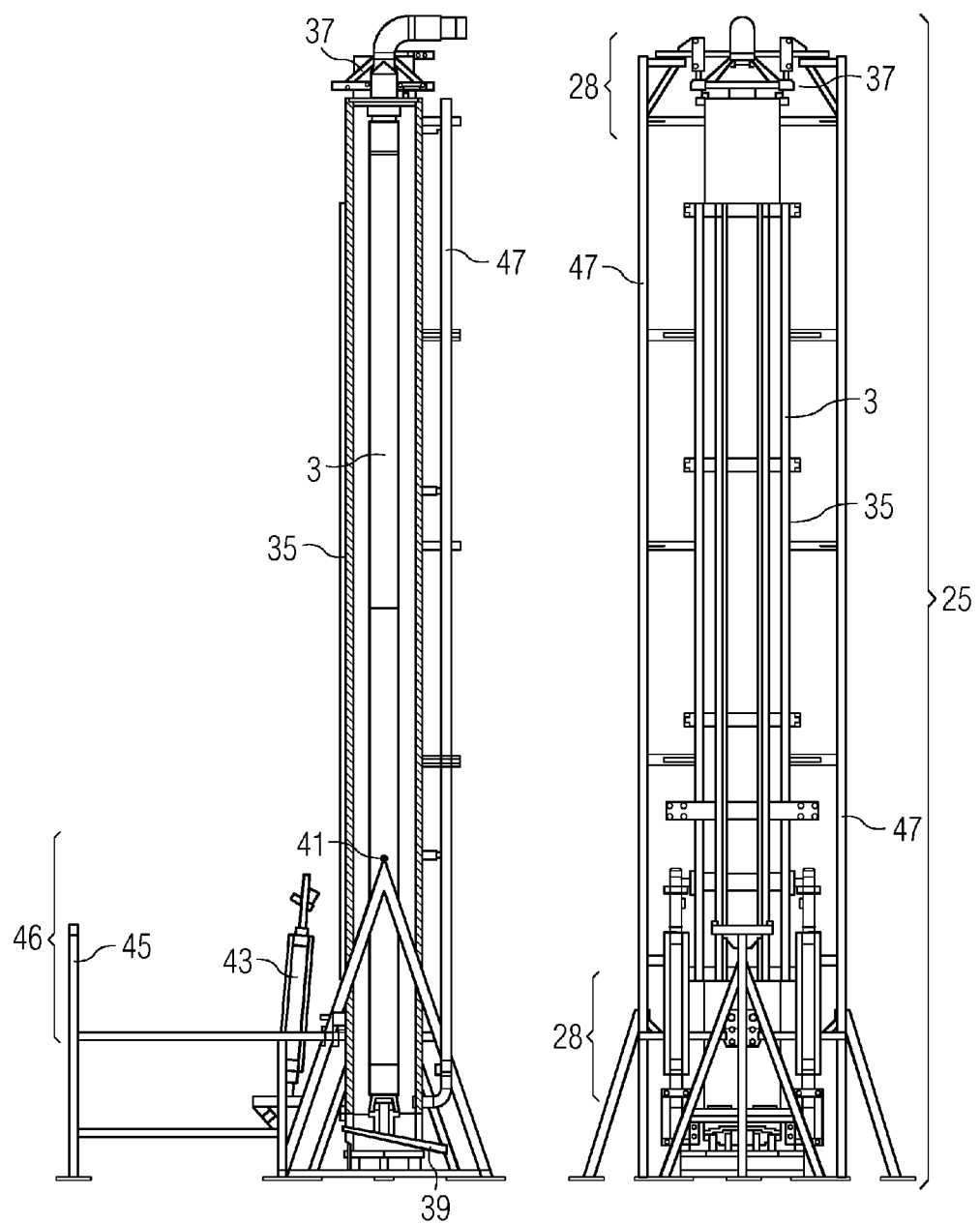
FIG. 3 shows two cross-sectional views of a coating device comprising a glass sleeve in a position ready to be coated according to an embodiment of the invention.

FIG. 1 shows a cross-sectional view of a solar-receiver tube 1 according to an embodiment of the invention. It comprises a glass sleeve 3 with a diameter 11.5 cm and an absorber tube 13 which has a smaller diameter 7 cm and which extends parallel to the glass sleeve 3. These two tubes are connected to each other by interfaces 24. Those two interfaces 24 are positioned at the end sections of the glass sleeve 3 and of the absorber tube 13 and comprise glass-to-metal seals 18, metal bellows 23, internal shields 19 and external shields 21. Attached to the outer surface of the absorber tube 13 there are getters 17 designed to collect barium and hydrogen particles and thus to maintain a vacuum 15 in the space between the glass sleeve 3 and the absorber tube 13. The solar-receiver tube 1 has a length of 406 cm.

FIG. 2 shows a cross-sectional view of the wall of the glass sleeve 3 as part of a solar-receiver tube 1, which glass sleeve 3 comprises two types of essentially translucent coatings applied to it. As a first layer, an anti-reflective coating 9 is applied to an outer surface 7 and an inner surface 5 of the glass sleeve 3. As a second layer, a scratch-resistant coating 11 is applied solely on the outer surface 7 of the glass sleeve 3 according to the invention.

FIG. 3 shows a long-side cross-sectional view (left) of a coating device 25 according to an embodiment of the invention and a front-side cross-sectional view of the same coating device 25, i.e. turned about 90° counter-clockwise. The coating device has a height of approximately 570 cm. It comprises an elongated cylindrical coating tank 35 with an inner diameter of approximately 32 cm, which is mounted within a bearing frame 47, and a tilt mechanism 46 for tilting the coating tank 35. The coating tank 35 can be rotated about a tilt axis 41 between two operating positions: In a position suitable for introducing a glass sleeve 3 the coating tank 35 is positioned horizontally while being supported by a movable support device 43 and a fixed support device 45. In a position suitable for applying a coating to a loaded glass sleeve 3 the tank is positioned vertically. The tilt angle between the two mentioned operating positions is essentially rectangular. In the vertical operating position the two openings of the coating tank 35 connect to a top cover 37 and to a bottom cover 36 of the coating tank, which are part of the coating device 25.

Figure 4:
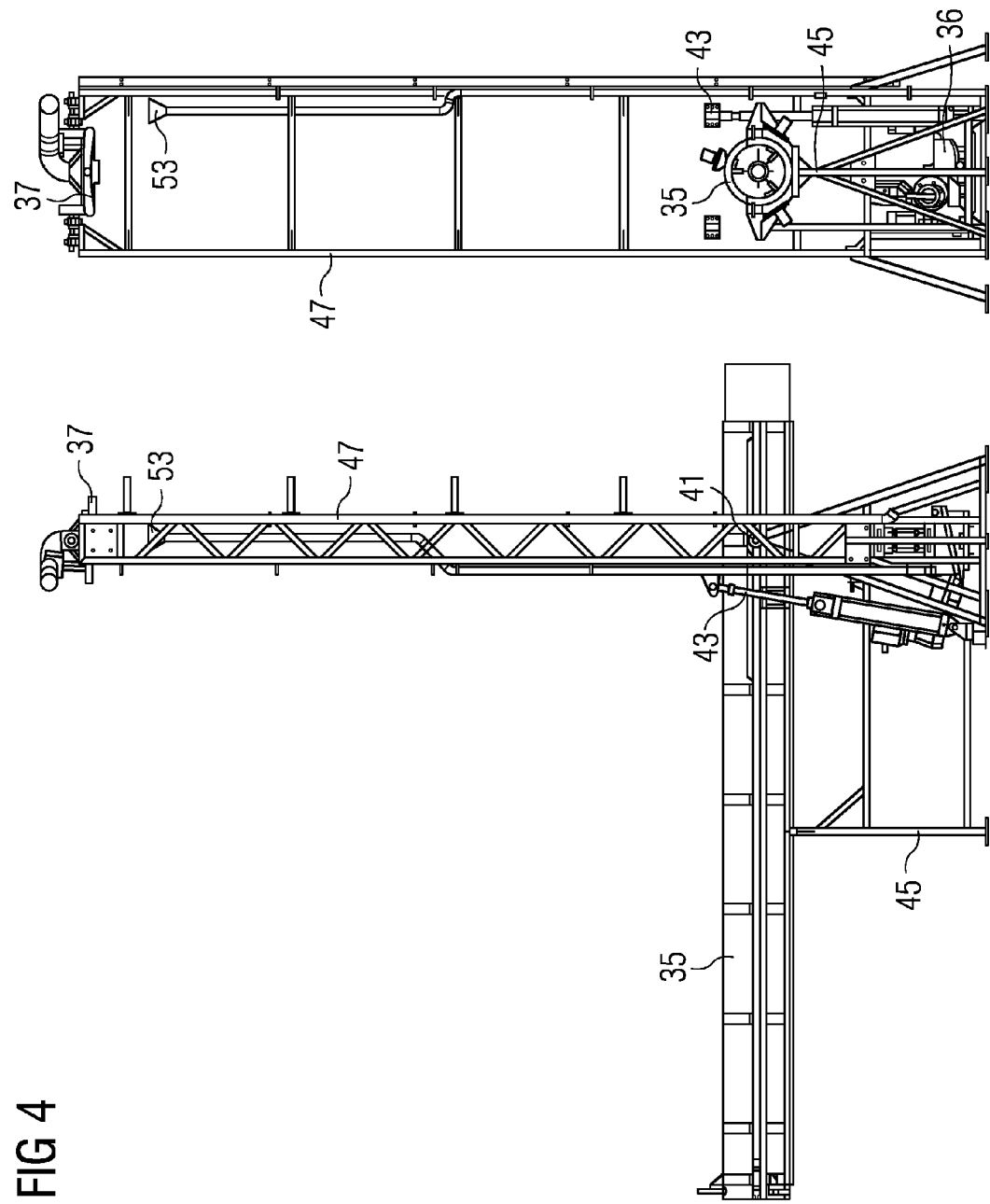
FIG. 4 shows cross-sectional views of an embodiment of the same coating device as in FIG. 3 with the glass sleeve in a horizontal position.

FIG. 4 again shows a long-side cross-sectional view and a front-side cross-sectional view of the coating device 25. The coating tank 35 is now positioned horizontally within the coating device 25 while being supported by the movable support device 43 and the fixed support device 45. The coating tank 35 is mounted in the bearing frame 47 by means of the tilt axis 41 serving as a centre of rotation between a horizontal position and a vertical position of the coating tank 35. Fixed in the bearing frame 47 there are a top cover 37 and a bottom cover 36 of the coating tank as well as a funnel 53 serving as a drain for overflowing coating liquid.

Figure 5:
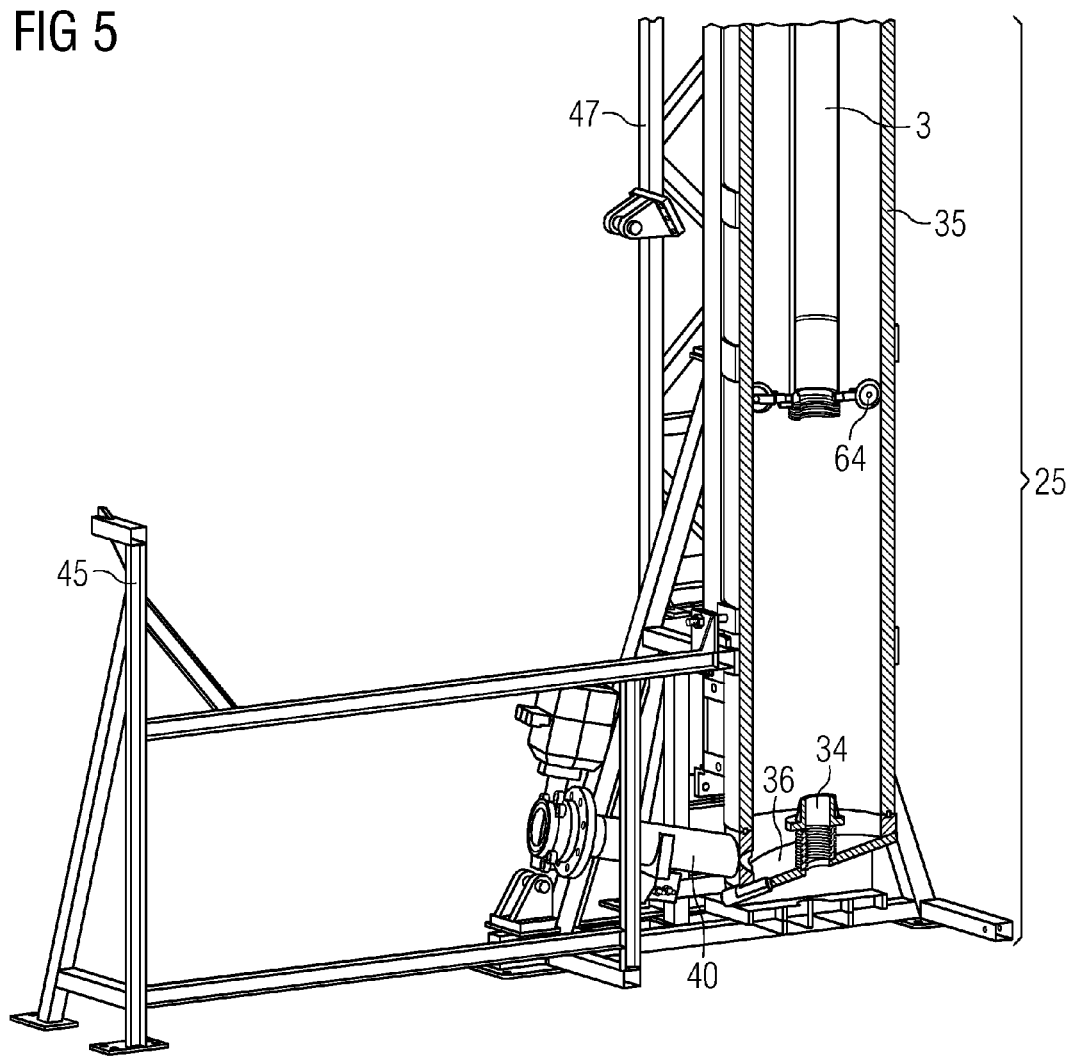
FIG. 5 shows a cross-sectional, perspective view of an embodiment of a bottom part of the coating device of FIGS. 3 and 4.

FIG. 5 shows a cross-sectional view of the bottom part of the coating device 25. A coating tank 35 rests in a vertical position and at its bottom opening closes flush with a bottom cover 36 fixed at the bearing frame 47. As functional parts of the bottom cover 36 of the coating tank 35, a conical holder 34 of the glass sleeve 3 and an inlet 40 for introducing a liquid coating into the coating tank 35 are displayed. The cylindrical coating tank 35 contains a cylindrical glass sleeve 3 with a smaller diameter which glass sleeve 3 is held in a position in the centre of the coating tank 35 by a bottom holder 64 comprising rollers which can be transported towards the conical holder 34.

Figure 6:
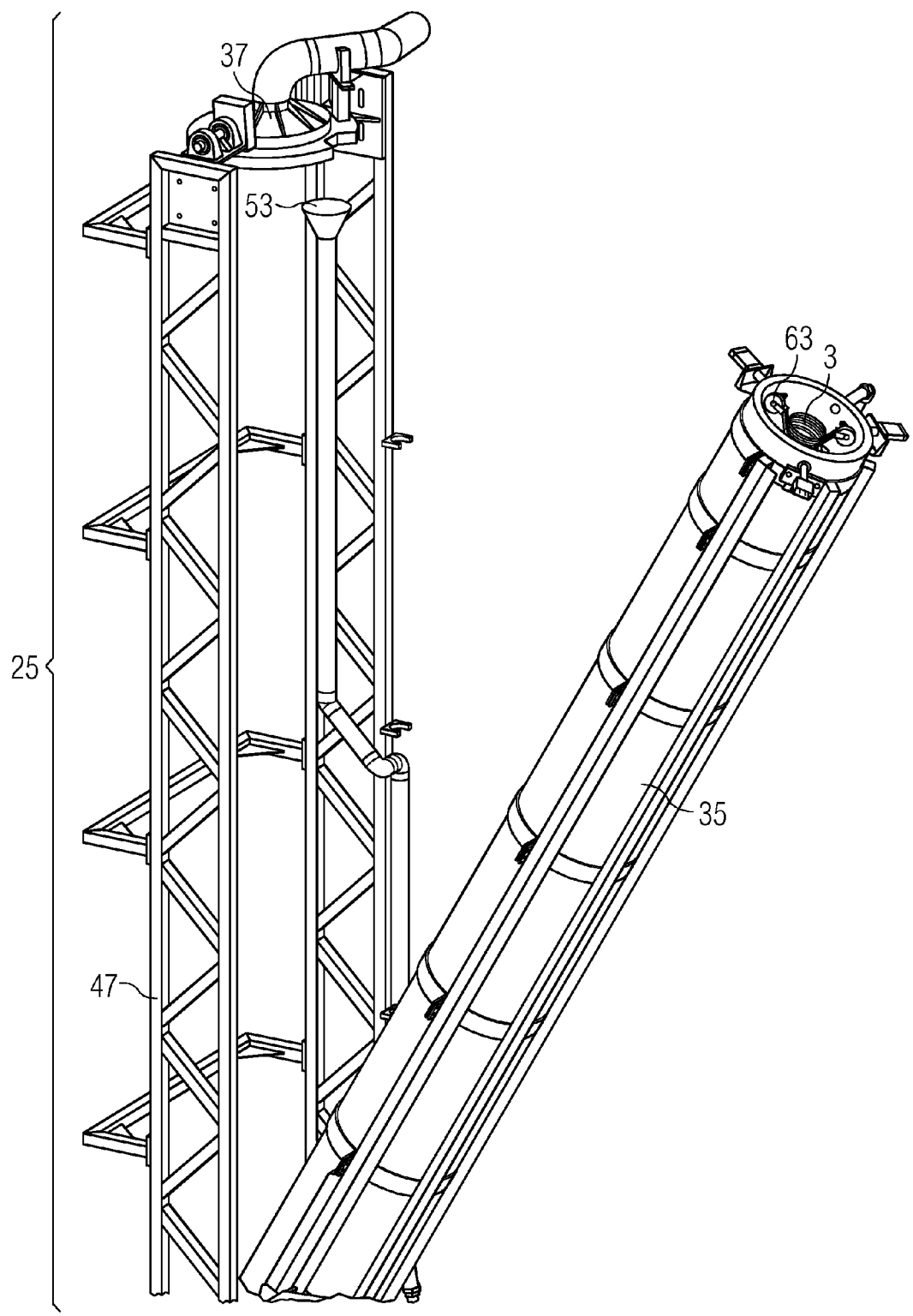
FIG. 6 shows a perspective view of an embodiment of an upper part of the coating device of FIGS. 3 to 5.

FIG. 6 shows a view of the upper part of the coating device 25, whereby the coating tank 35 is displayed in a position when being tilted between a horizontal and a vertical position. Fixed in the bearing frame 47 there are the top cover 37 of the coating tank 35 and the funnel 53 which serves as a drain for overflowing coating liquid. At the top opening of the coating tank 35 a glass sleeve 3 is displayed which is fixed in the centre of the cross-sectional diameter of the coating tank 35 by means of a top holder 63, again comprising rollers.

Figure 7:
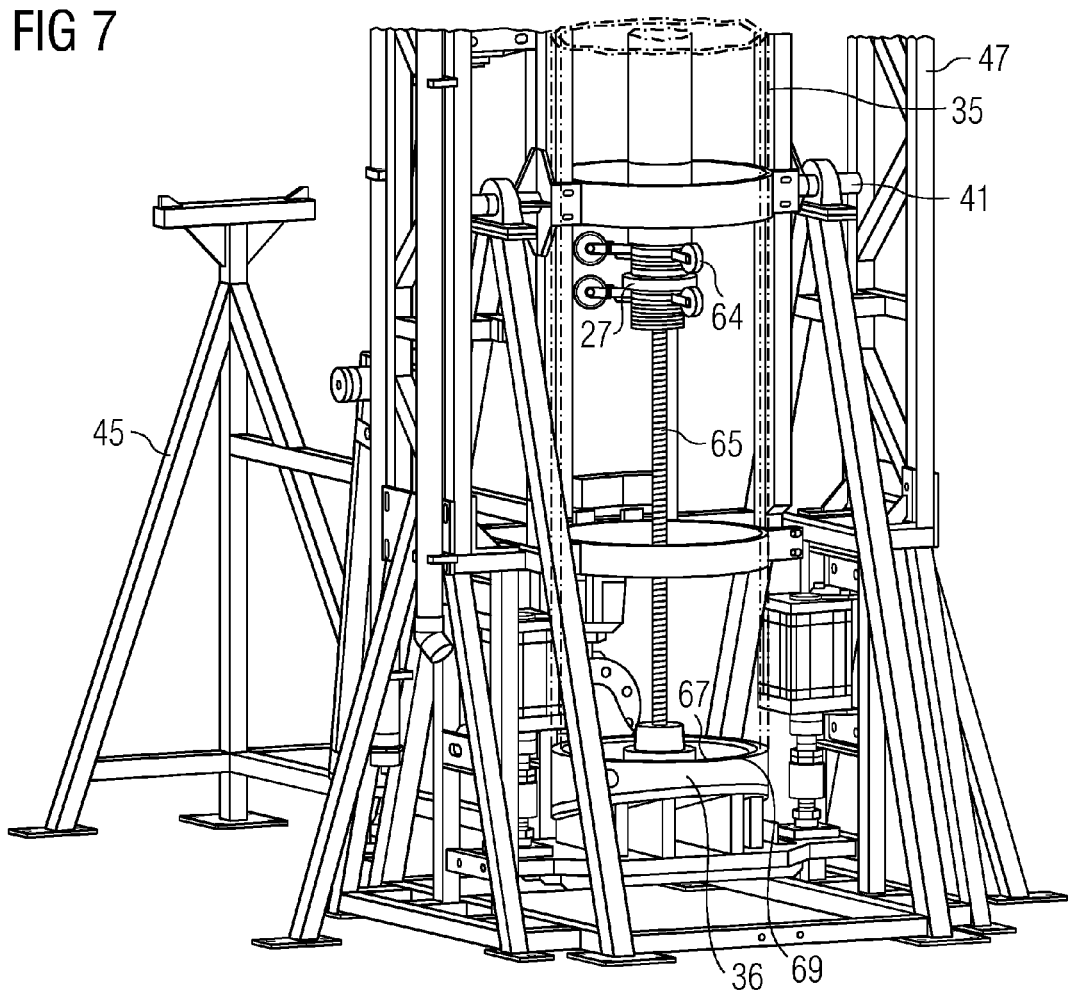
FIG. 7 shows a view of a bottom part of a coating device according to an embodiment of the invention.

FIG. 7 shows a view of the bottom part of a particular embodiment of a coating device 25 according to the invention. The coating tank 35 is displayed in a vertical operating position and its bottom opening closes flush with the bottom cover 37 of the coating tank 35, whereby a circular seal 67 attached to the tank wall interface 69 prevents the liquid coating from flowing out of the coating tank 35 during the coating process. As the glass sleeve 3 is considerably shorter than the coating tank 35, a screw adapter 65 bridges the resulting gap between the bottom cover 36 of the coating tank 35 and the bottom opening of the glass sleeve 3. The screw adapter 65 provides for moving the bottom interface 27 to a position where it can connect to the bottom opening of the glass sleeve 3. The glass sleeve 3 is held in the centre of the cross-sectional diameter of the coating tank 35 by means of a bottom holder 64. As parts of the bearing frame 47, the tilt axis 41 and the fixed support device 45 are displayed.

Figure 8:
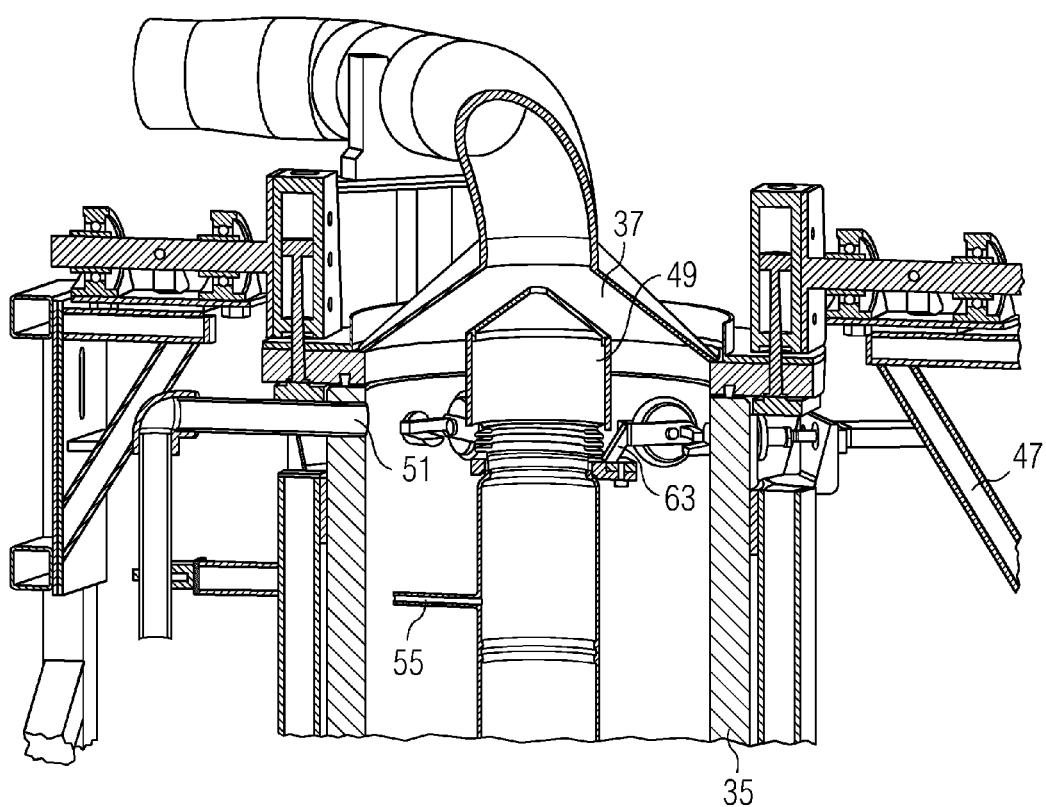
FIG. 8 shows a cross-sectional view of an embodiment of a top part of a coating device according to an embodiment of the invention.

FIG. 8 shows a cross-sectional view of the top part of a particular embodiment of a coating device 25 according to the invention. The coating tank 35 is displayed in a vertical operating position and its top opening closes flush with the top cover 37 of the coating tank fixed at the bearing frame 47. The glass sleeve 3 is fixed within the coating tank 35 by means of a top holder 63. The top opening of the glass sleeve 3 is closed by a cylindrical flexibly moveable upper head 49 comprising a conically shaped ending. The figure moreover shows an evacuation tube 55 protruding from the wall of the glass sleeve 3 that provides for generating a vacuum when a solar-receiver tube 1 is finally assembled.

Figure 9:
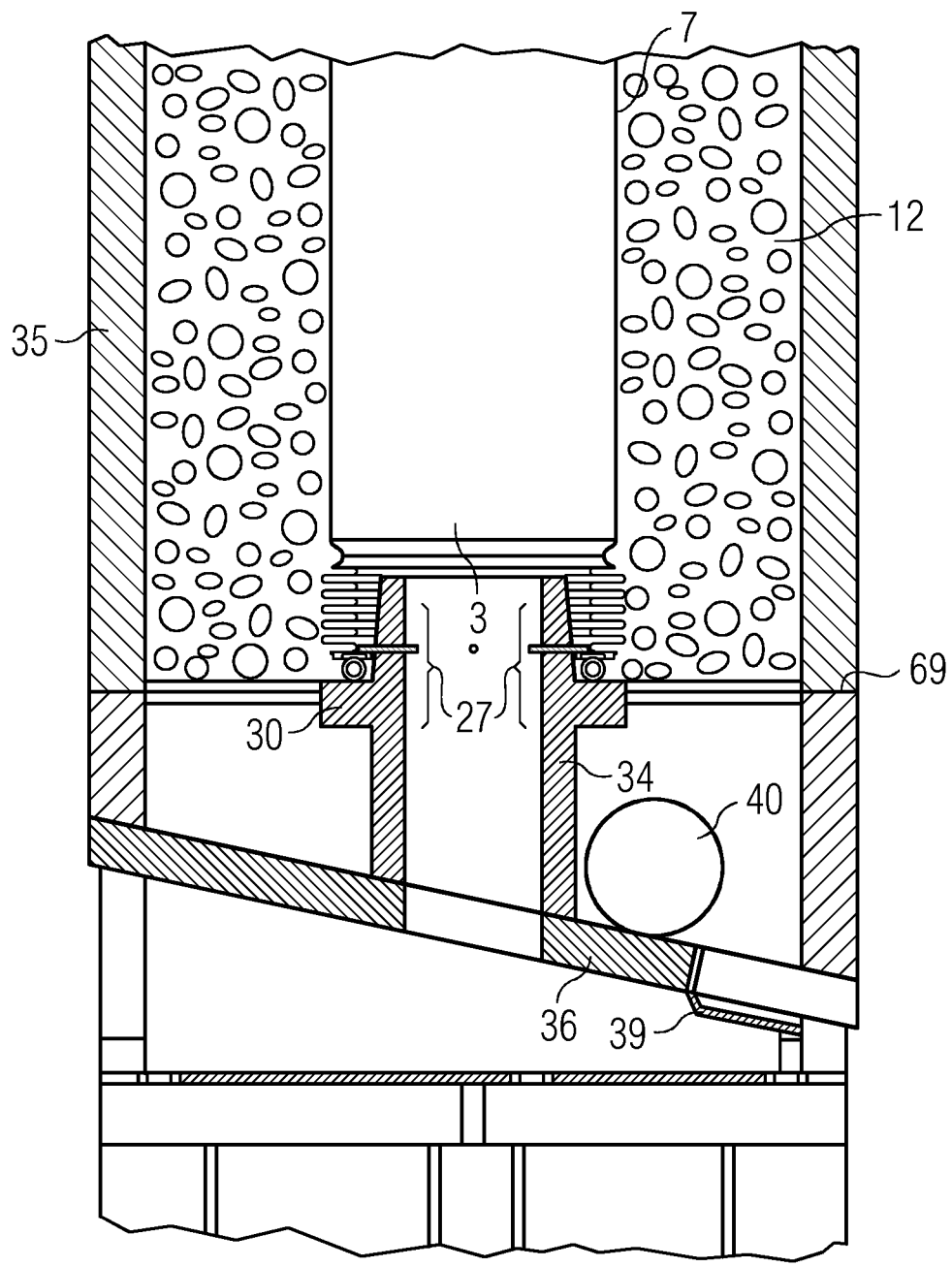
FIG. 9 shows a cross-sectional view of an embodiment of a fixing arrangement in a bottom region of a coating tank according to an embodiment of the invention.

FIG. 9 shows a cross-sectional view of the bottom region of a coating tank 35 comprising a glass sleeve 3 in the interior of the coating tank 35. The glass sleeve 3 is depicted in an operating position during the process of applying a liquid coating 12 to the outer surface 7 of the glass sleeve 3. During the coating process the liquid coating 12 fills solely the space between the wall of the coating tank 35 and the wall of the glass sleeve 3. The glass sleeve 3 is fixed to a conical holder 34 by means of a bottom interface 27. At the bottom cover 36 of the coating tank 35 there are an inlet 40 for introducing the liquid coating into the tank and a drain 39 for emptying the coating tank 35 after completing the coating process.

Figure 10:
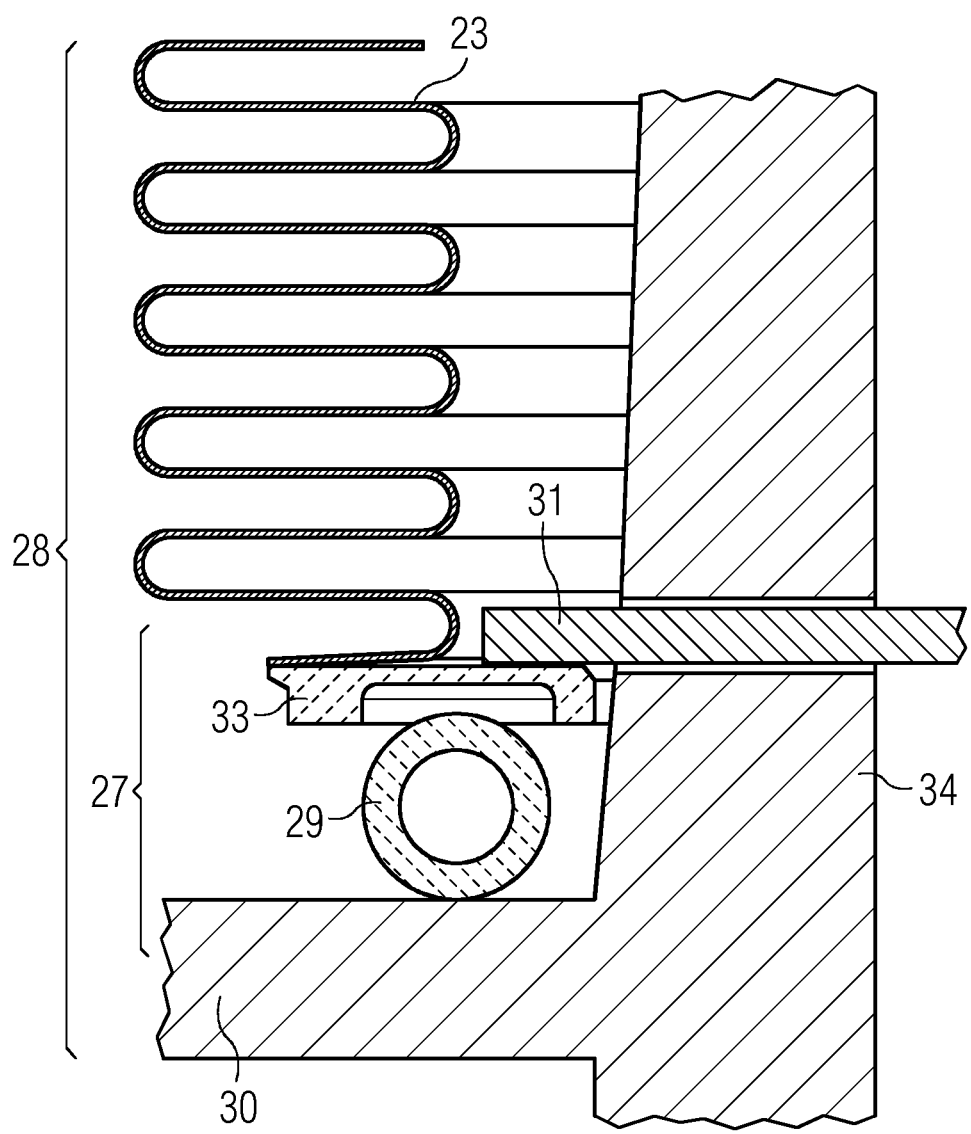
FIG. 10 shows a cross-sectional view of an embodiment of a fixing arrangement in a bottom region of a coating tank according to an embodiment of the invention, which is more detailed than FIG. 9.

FIG. 10 shows a cross-sectional view of a fixing arrangement 28 in a bottom region of the coating tank 35. The glass sleeve 3 is held in a predefined position by a bottom interface 27. At its circular openings the glass sleeve 3 comprises metal bellows 23 and end sections 33 attached to the metal bellows 23. The bottom interface 27 comprises an inflatable seal 29 in form of an annular tube, which seal rests on a circular cornice 30 as part of a conical holder 34 of the glass sleeve 3. The bottom interface 27 further comprises three to four shear pins 31 which are shiftable on a horizontal plane within the conical holder 34. The shear pins 31 are designed to hold the end section 33 of the glass sleeve 3 in a predefined position when the inflatable seal 29 is inflated and thus exerts pressure on the end section 33 from the opposite side of the end section 33. The diameter of the inflatable seal 29 when inflated of 8.5 cm is identical with the inner diameter of the metal bellow 23 and smaller than the outer diameter of the metal bellow 23 (11.5 cm). The bottom interface 27 functions both as a sealing mechanism preventing a liquid coating 12 from entering the interior of the glass sleeve 3 and as a fixing arrangement 28 holding the glass sleeve 3 in a predefined position within the coating tank 35.

Figure 11:
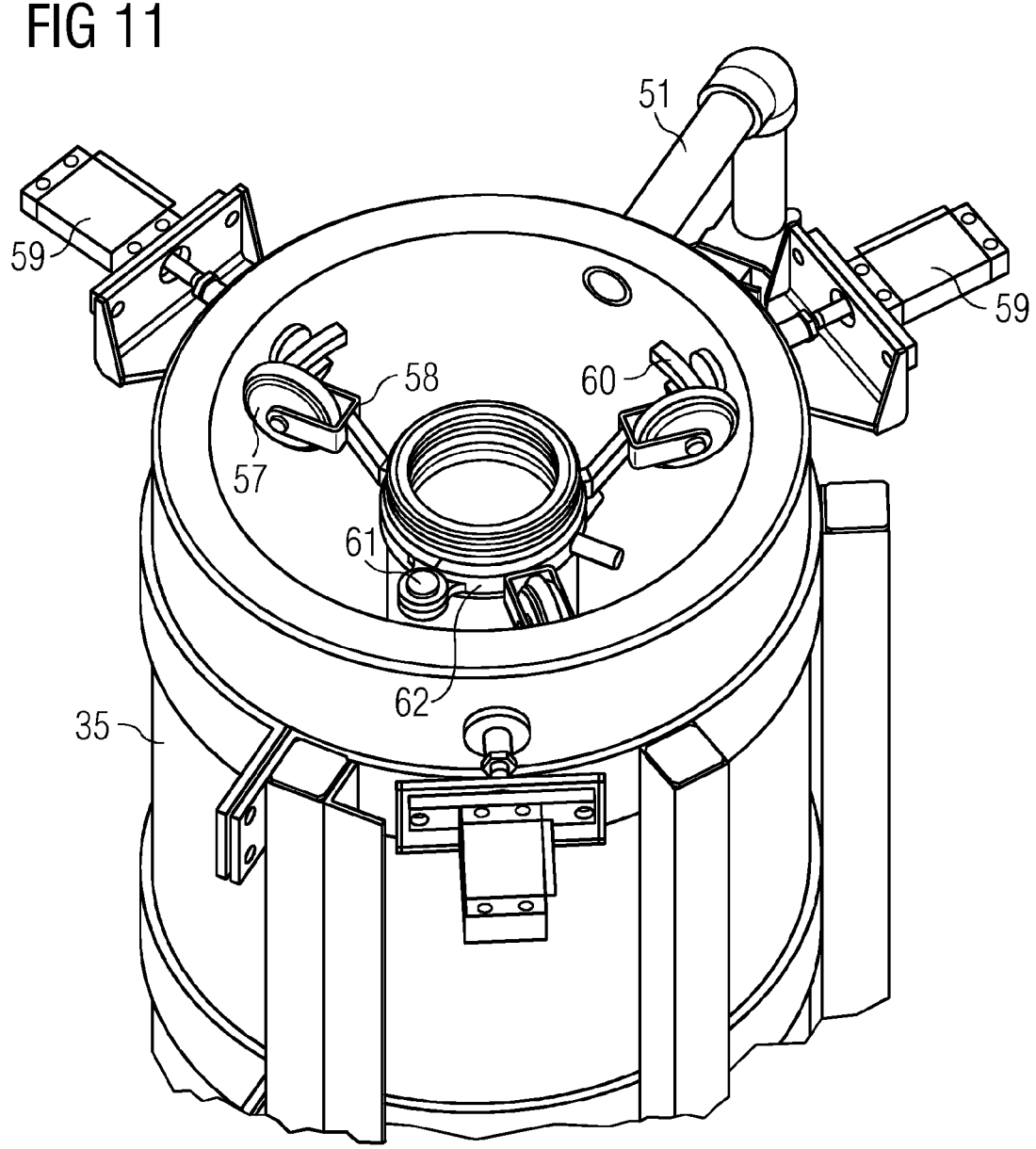
FIG. 11 shows a view of an embodiment of a top opening of a coating tank according to an embodiment of the invention.

FIG. 11 shows a view of the top opening of a cylindrical coating tank 35 containing a cylindrical glass sleeve 3 with a smaller diameter which glass sleeve 3 is mounted in a top holder 63. By means of the top holder 63 the wall of the glass sleeve 3 rests in equal distance to the wall of the coating tank 35. The top holder 63 consists of a flexible ring 62 which encloses an end section of the glass sleeve 3 and can be fastened by a locking pin 61 so that a fix connection is established between the glass sleeve 3 and the flexible ring 62. Three rollers 57 are mounted at the flexible ring 62 and run along the inner wall of the coating tank 35 when the glass sleeve 3 with the mounted top holder 63 is loaded into or unloaded from the coating tank 35. Further, the top holder 63 comprises movable pistons 59 mounted at the outside wall of the coating tank 35 which pistons 59 are connected to fixings 60 which fixings interface with the guide frame 58 of the rollers 57 when the pistons 59 are extended in direction to the center of the coating tank 35. By means of this fixing mechanism the glass sleeve 3 is prevented from moving uncontrolledly in the coating tank 35. Fixed at the top of the coating tank 35 there is an overflow tube 51 designed to prevent the liquid coating from being spilled when flowing over the edge of the coating tank 35 when the latter is flooded with it.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A glass sleeve with an inner surface and an outer surface, the glass sleeve being a part of a solar-receiver tube of a parabolic-trough power plant, wherein a scratch-resistant coating for protecting surfaces against mechanical stress is solely applied to the outer surface of the glass sleeve.

2. A method of applying a coating to a glass sleeve with an inner surface and an outer surface, wherein the glass sleeve is a part of a solar-receiver tube of a parabolic-trough power plant, wherein a scratch-resistant coating for protecting surfaces against mechanical stress is solely applied to the outer surface of the glass sleeve.

3. The method according to claim 2, wherein the coating is applied as a fluid coating.

4. The method according to claim 3, wherein the coating is applied by using a dipping process.

5. The method according to claim 3, wherein a coating tank is flooded with the coating after fastening the glass sleeve in a predefined operating position within a coating tank.

6. A coating tank for applying a coating to a glass sleeve with an inner surface and an outer surface, the glass sleeve being a part of a solar-receiver tube of a parabolic-trough power plant, wherein the coating tank is configured to apply a scratch-resistant coating for protecting surfaces against mechanical stress solely to the outer surface of the glass sleeve.

7. The coating tank according to claim 6, comprising at least one seal positioned to interface with an opening of the glass sleeve when the glass sleeve is positioned in a designated operating position within the coating tank.

8. The coating tank according to claim 7 wherein the at least one seal comprises an inflatable seal.

9. The coating tank according to claim 6, comprising a shear pin which fixes an end section of the glass sleeve in a predefined position.

10. The coating tank according to claim 6, comprising at least:
- an inlet for introducing a coating into the coating tank,
- a drain to collect a surplus amount of the coating at a bottom region of the coating tank, and
- an adaptive fixing arrangement for holding differently sized glass sleeves in different designated operating positions within the coating tank.

\* \* \* \* \*